Patented Aug. 2, 1949

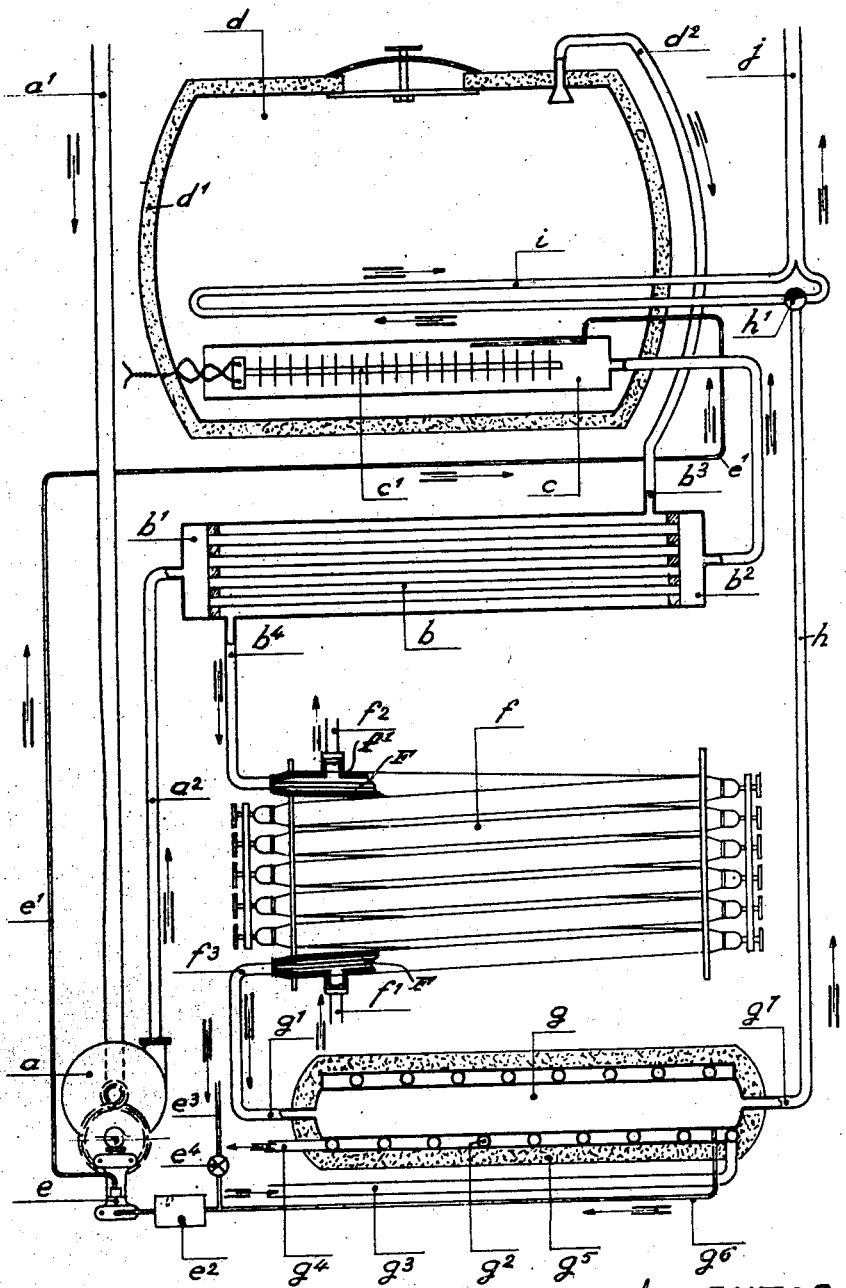

2,477,964

UNITED STATES PATENT OFFICE 2,477,964

METHOD FOR THE STERILIZATION AND PURIFICATION OF AIR

Henri Corblin, Paris, France; Pierre Caziot executor of said Henri Corblin, deceased Application April 18, 1945, Serial No. 588,921
In France November 10, 1943

Section 1, Public Law 690, August 8, 1946
Patent expires November 10, 1963

3 Claims. (Cl. 21—53)

The present invention relates to air sterilization and purification methods and plants of the type in which no chemical action is utilized.

It has already been proposed to feed steam into a room, for instance an operation room, at normal temperature so as thus to produce, in this room, a fog which is caused to condense on a battery of refrigerators. This method indeed permits a more or less complete elimination of dust, but not a true sterilization of air, since the latter does not contain a sufficient amount of moisture and is only at a temperature of 25° C., which is insufficient for ensuring destruction of the germs it contains.

As a matter of fact, these germs are capable, especially in dry air or in an air containing an insufficient amount of moisture, of withstanding a temperature of at least 110° C.

The method according to the present invention consists in passing the air to be treated through a chamber in which it is brought to a minimum temperature of 150° C., adding to this hot air an important amount of steam (at least 150 gr. of water per cubic metre of air), keeping the mixture of hot air and steam in this chamber for the time necessary for the destruction of all germs (about one minute), and then cooling this air, after its outflow from said chamber, so as to cause the steam that has been added thereto to condense, which ensures the depositing of dust and dead germs, before feeding this air to the room where it is desired to obtain a fully sterilized atmosphere.

It is known that the higher the temperature to which air is brought the more considerable is the amount of steam it can contain in suspension without condensation of this steam. At temperatures ranging from 150 to 160° C., air can contain, without condensation, an amount of steam higher than 150 gr. of water per cubic metre of air. On the other hand, the noxious germs contained in air are much more easily destroyed in air containing a high percentage of moisture than in dry air or air containing but a small amount of moisture.

It will be readily understood that, in a homogeneous mixture of air and steam that has been kept for a sufficient time at a temperature of 150° C., a gradual cooling causes the formation of extremely small drops, uniformly distributed through the whole mass of gas, which drops cause all particles in suspension in air to deposit together with them, and this much more satisfactorily than in the case of a fog obtained by a steam projected into a room at lower temperature (say 25° C.).

I have found that, by keeping for one minute at a temperature of 150° C. a mass of air containing 150 gr. of steam per cubic meter of air to be treated, the germs are wholly destroyed and are precipitated, together with dust, when the steam present in said mass of air is condensed by cooling and that, in this way, air is obtained that is practically pure and fully sterilized, without requiring any filtration.

A preferred embodiment of my invention will be hereinafter described with reference to the appended drawing, given merely by way of example, and in which:

The only figure is a diagrammatic view of a plant for carrying out the method according to the invention.

The stream of air to be sterilized is sucked in, through a pipe $a^1$, which extends upwardly to a distance above the roof of the building, by means of a fan $a$ which discharges it, under a slight pressure, through conduit $a^2$ into a heat interchanging tubular system $b$, into which said air enters at $b^1$ and from which it flows out at $b^2$. Said air is then passed through a big tube $c$ located inside a structure of aluminium, enamelled steel, or stainless steel, forming a chamber $d$. This tube $c$ contains electric (or steam) heating radiators $c^1$, which bring said air to a temperature averaging 150° C.

A small pump $e$, of the adjustable flow type, injects, through conduit $e^1$, into tube $c$ and onto radiators $c^1$, a certain volume of water which is vaporized into steam which is incorporated with the air that is entering chamber $d$. Of course, this chamber is heat insulated, as shown at $d^1$, so as to maintain therein, as well as possible, the proper temperature. The volume of this chamber is sufficient for causing the heated air mixed with steam to remain therein for the time sufficient for ensuring complete destruction of the germs present therein. It has been found that it suffices to inject into the air to be sterilized an amount of water corresponding to about 150 gr.

of water per cubic metre of air, heated to a temperature of about 150° C. This air thus contains an amount of steam which is about twenty times that present therein when it entered heating tube c. It would be possible to inject a much greater amount of water.

At the opopsite end of chamber d, the stream of hot air, still containing this amount of steam, escapes through pipe $d^2$. This air is still at a temperature of 150° C. Tube $d^2$ opens at $b^3$ into tubular heat interchanger b. Thus the escaping hot air heats the incoming cold air and is itself cooled. The excess of steam present in this hot air already starts condensing. The still hot air is then fed, through $b^4$, into a cooling device f, made of aluminum or stainless steel tubes F coaxially surrounded by other steel tubes $F_1$. In the annular space between these tubes is provided a counter-current circulation of cold water, preferably supplied from a well, which enters tube $F_1$ at $f^1$ and flows out therefrom at $f^2$. Upon leaving this cooling device, through tube $f^3$, the air that has flown through tube F is at a temperature approximating that of the incoming stream of water. It has therefore been considerably cooled and the steam present therein has condensed, and deposited, together with dust and all germs, which are dead.

The stream of air thus cooled then enters, at $g^1$, a large cylinder g, in order to reduce its velocity, which is still relatively high when leaving cooling device f. In this cylinder g, said stream of air loses this velocity so as to enable the particles of water that may remain therein to deposit. This cylinder may, as shown by the drawing, be surrounded by a cooling coil $g^2$ the inlet of which is at $g^3$ and the outlet at $g^4$, and the whole may be fitted with a heat insulating lining $g^5$.

The condensed water that flows from the tubes of cooling device f and from cylinder g constitutes distilled water which is collected at the outlet of cylinder g and is brought, after passing through filter $e^2$, to the small water pump e, which again sends it onto the heating radiators $c^1$ of chamber d, where it is again vaporized. An additional water inlet $e^3$, fitted with a cock $e^4$, permits of completing the necessary volume of water.

The refrigerated air which flows out from cylinder g at $g^7$ passes into a tube h provided, between two branch lines, with a three-way cock $h^1$. One of these branch lines forms a U tube located in chamber d close to the big tube c that contains radiators $c^1$. The outlet of this U tube i leads back to the air distribution tube j, where it merges with the other branch line from cock $h^1$. Thus, according to the position of this cock, a more or less important portion of the air stream fed from cooling system f—g through tube h is caused to flow through the U tube i, where it is heated. It is therefore possible to obtain, beyond said three-way cock, in the air distribution tube j, a stream of air which is sterile, free from dust, still under a slight pressure, the temperature of which can be adjusted by means of cock $h^1$, and which is distributed according to the needs.

In the course of the very important condensation of steam that takes place, it happens that some gases, of rather noxious nature, are dissolved, and the sterilized air is therefore freed from said gases and further improved.

In order to achieve sterilization, deposition of dust and improvement of the air that is treated, it is necessary to perform the following operations, as above explained:

1. To heat this air to a high temperature, averaging 150° C., which temperature is determined by adjustment of radiators $c^1$;
2. To introduce into this air to be treated an important amount of water which, at this temperature, vaporizes and remains in suspension in air, in the form of steam;
3. To keep the mixture thus obtained of air and water in this state for a certain time, which implies the use of a chamber of suitable volume.

The volume of water to be introduced into chamber d is determined by means of small pump e, which injects this water onto radiators $c^1$, provided in tube c. It is thus possible to obtain in chamber d an amount of steam which will subsequently yield the weight of condensed water sufficient for causing dust to be separated and the dead germs to be deposited.

The cooling coil $g^2$ that surrounds cylinder g is not absolutely necessary. In the absence of such a coil, air flows out of this cylinder at a temperature of about 15° C. It is heated by its passage through U tube i, or in the rooms where it is utilized, so that it is finally brought to a temperature of 20-22° C. whereby its hygrometric state is again normal. But if, despite this rise of temperature, the hygrometric state still seemed to be too high, use is then made of cooling coil $g^2$. In this case, the air stream leaves cylinder g at a lower temperature and as the subsequent rise of temperature will be greater, the hygrometric state of the air will be accordingly lower. This necessarily involves the use of a small refrigerator compressor if it is desired to obtain a rather dry air.

The heat interchangers and cooling devices may, of course, be modified. Instead of having the water from pump e fed, through conduit $e^1$, onto radiators $c^1$, in tube c (so that this volume of water vaporizes into steam which mixes with the air fed into chamber d), I might inject this volume of water through pump e into the heat interchanger b. This way of proceeding would have the advantage of utilizing, by interchange of temperature, the mixture of air and steam at 150° C. that is fed from chamber d through pipe $d^2$ and circulates through this heat interchanger for vaporizing at least a portion of the water mixed with the stream of fresh air to be sterilized.

In a general manner, while I have, in the above description, disclosed what I deem to be practical and efficient embodiments of the present invention, it should be well understood that I do not wish to be limited thereto as there might be changes made in the arrangement, disposition and form of the parts without departing from the principle of the invention as comprehended within the scope of the accompanying claims.

What I claim is:

1. The method of sterilizing and purifying a mass of air which comprises heating said mass to a temperature of at least 150° C., adding to this mass an amount of water at least equal to 150 gr. per cubic meter, allowing the mixture of hot air and steam thus formed to remain in this state for at least one minute, and cooling it to produce condensation of at least a part of this steam.

2. The method of sterilizing and purifying a mass of air which comprises circulating a stream of air across a chamber at a temperature of at least 150° C., injecting water into said chamber at the rate of at least 150 gr. per cubic meter of air, adjusting the circulation of air so that said mixture of air and steam remains in this chamber for at least one minute, and cooling this mixture after it has left said chamber so as to condense at least a part of the steam present therein.

3. The method of sterilizing and purifying a mass of air which comprises circulating a stream of air across a chamber at a temperature of at least 150° C., injecting water into said chamber at the rate of at least 150 gr. of water per cubic meter of air, adjusting the circulation of air so that said mixture of air and steam remains in this chamber for at least one minute, cooling this mixture after it has left said chamber so as to condense at least a part of the steam present therein, and returning the condensed water to said chamber to be again vaporized therein and mixed with air flowing therethrough.

HENRI CORBLIN.

REFERENCES CITED

The following references are of record in the file of this patent:

UNITED STATES PATENTS

| Number | Name | Date |
| --- | --- | --- |
| 215,572 | Chase | May 20, 1879 |
| 402,714 | Benson | May 7, 1889 |
| 903,150 | Braener | Nov. 3, 1908 |
| 1,022,496 | Muller et al. | Apr. 9, 1912 |
| 2,045,519 | Coutant | June 23, 1936 |

OTHER REFERENCES

Carswell et al., "Bacterial Control in Air Conditioning," Ind. & Eng. Chem., Jan. 1937, pp. 85 to 89.